US012739638B2

(12) United States Patent
Teyeb et al.

(10) Patent No.: US 12,739,638 B2
(45) Date of Patent: Sep. 15, 2026

(54) METHOD AND APPARATUS FOR EFFICIENT HANDLING OF THE UPDATES OF SERVING/NEIGHBOR CELL INFORMATION

(71) Applicant: INTERDIGITAL PATENT HOLDINGS, INC., Wilmington, DE (US)

(72) Inventors: Oumer Teyeb, Montreal (CA); Martino Freda, Laval (CA); Jaya Rao, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 289 days.

(21) Appl. No.: 18/284,495

(22) PCT Filed: Mar. 30, 2022

(86) PCT No.: PCT/US2022/022466
§ 371 (c)(1),
(2) Date: Sep. 27, 2023

(87) PCT Pub. No.: WO2022/212450
PCT Pub. Date: Oct. 6, 2022

(65) Prior Publication Data

US 2024/0179528 A1 May 30, 2024

Related U.S. Application Data

(60) Provisional application No. 63/168,167, filed on Mar. 30, 2021.

(51) Int. Cl.
*H04W 12/06* (2021.01)
*H04W 12/041* (2021.01)
(Continued)

(52) U.S. Cl.
CPC ....... *H04W 12/106* (2021.01); *H04W 12/041* (2021.01); *H04W 36/362* (2023.05)

(58) Field of Classification Search
CPC ............. H04W 12/106; H04W 12/041; H04W 36/362; H04W 36/0038; H04W 60/04
See application file for complete search history.

(56) References Cited

U.S. PATENT DOCUMENTS 11,678,238 B2 6/2023 Chang et al.
2007/0297367 A1* 12/2007 Wang .................. H04W 12/106 370/331

(Continued)

FOREIGN PATENT DOCUMENTS

WO 2020/262124 12/2020

OTHER PUBLICATIONS

Vivo, "Discussion on PLMN selection in Inactive state," 3GPP TSG-RAN WG2 Meeting #105, R2-1901822, Athens, Greece (Feb. 25-Mar. 1, 2019).

(Continued)

*Primary Examiner* — Izunna Okeke
(74) *Attorney, Agent, or Firm* — VOLPE KOENIG

(57) ABSTRACT

A wireless transmit receive unit (WTRU) may be configured to receive an indication/configuration from a network regarding changes in information related to the serving cell's identity (e.g., Physical cell identity (PCI), Cell Global Identity (CGI), etc.), which may contain additional information such as the conditions when this change becomes effective. Upon the reception of this indication, and if a condition is also specified, fulfillment of the condition, the WTRU may be configured to consider the new PCI/CGI as the serving cell's PCI/CGI, consider the old PCI as belong- (Continued)

ing to a neighbor cell, and/or may update the security keys that are used for encryption and integrity protection based on the new PCI.

16 Claims, 12 Drawing Sheets

(51) Int. Cl.
*H04W 12/106* (2021.01)
*H04W 36/36* (2009.01)

(56) References Cited

U.S. PATENT DOCUMENTS

2014/0126545 A1 5/2014 Tamura et al.
2023/0120096 A1* 4/2023 Kim ...................... H04W 76/19 370/329

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802. Nov. 2020 (Dec. 3, 2020).
Interdigital, "Implications of inter-donor IAB migration," 3GPP TSG-RAN WG3 Meeting #112-e, R3-212249, online (May 17-27, 2021).
Third Generation Partnership Project, "Technical Specification Group Radio Access Network; NR; Radio Resource Control (RRC) protocol specification (Release 16)," 3GPP TS 38.331 V16.3.1 (Jan. 2021).
Third Generation Partnership Project, "Technical Specification Group Radio Access Network; NR; Radio Resource Control (RRC) protocol specification (Release 16)," 3GPP TS 38.331 V16.7.0 (Dec. 2021).
Third Generation Partnership Project, "Technical Specification Group Radio Access Network; NR; Radio Resource Control (RRC) protocol specification (Release 16)," 3GPP TS 38.331 V16.2.0 (Sep. 2020).
Third Generation Partnership Project, "Technical Specification Group Radio Access Network; NR; NR and NG-RAN Overall Description; Stage 2 (Release 16)," 3GPP TS 38.300 V16.2.0 (Jul. 2020).
Third Generation Partnership Project, "Technical Specification Group Radio Access Network; NR; NR and NG-RAN Overall Description; Stage 2 (Release 16)," 3GPP TS 38.300 V16.5.0 (Mar. 2021).
Third Generation Partnership Project, "Technical Specification Group Radio Access Network; NR; NR and NG-RAN Overall Description; Stage 2 (Release 16)," 3GPP TS 38.300 V16.8.0 (Dec. 2021).
Third Generation Partnership Project, "Technical Specification Group Radio Access Network; NR; Backhaul Adaptation Protocol (BAP) specification (Release 16)," 3GPP TS 38.340 V16.5.0 (Jun. 2021).
Third Generation Partnership Project, "Technical Specification Group Radio Access Network; NR; Physical layer procedures for control (Release 16)," 3GPP TS 38.213 V16.4.0 (Dec. 2020).
Third Generation Partnership Project, "Technical Specification Group Radio Access Network; NR; Physical layer procedures for control (Release 16)," 3GPP TS 38.213 V16.8.0 (Dec. 2021).
Third Generation Partnership Project, "Technical Specification Group Radio Access Network; NR; Physical layer procedures for control (Release 17)," 3GPP TS 38.213 V17.0.0 (Dec. 2021).
Third Generation Partnership Project, "Technical Specification Group Radio Access Network; NG-RAN; NR user plane protocol (Release 16)," 3GPP TS 38.425 V16.3.0 (Sep. 2020).
Third Generation Partnership Project, "Technical Specification Group Radio Access Network; NG-RAN; NR user plane protocol (Release 16)," 3GPP TS 38.425 V16.3.0 (Apr. 2021).
Third Generation Partnership Project, "Technical Specification Group Radio Access Network; NR; Packet Data Convergence Protocol (PDCP) specification (Release 16)," 3GPP TS 38.323 V16.3.0 (Mar. 2021).
Third Generation Partnership Project, "Technical Specification Group Radio Access Network; NR; Packet Data Convergence Protocol (PDCP) specification (Release 16)," 3GPP TS 38.323 V16.6.0 (Dec. 2021).
Third Generation Partnership Project, "Technical Specification Group Radio Access Network; NR; Study on Integrated Access and Backhaul; (Release 16)," 3GPP TR 38.874 V16.0.0 (Dec. 2018).
Third Generation Partnership Project, "Technical Specification Group Radio Access Network; NR; Backhaul Adaptation Protocol (BAP) specification (Release 16)," 3GPP TS 38.340 V16.3.0 (Dec. 2020).
Third Generation Partnership Project, "Technical Specification Group Radio Access Network; NR; Backhaul Adaptation Protocol (BAP) specification (Release 16)," 3GPP TS 38.340 V16.2.0 (Sep. 2020).
Third Generation Partnership Project, "Technical Specification Group Radio Access Network; Measurements of User Equipment (UE) Over-the-Air (OTA) performance for NR FR1; Total Radiated Power (TRP) and Total Radiated Sensitivity (TRS) test methodology (Release 17)," 3GPP TR 38.834 V0.4.0 (Mar. 2022).
Third Generation Partnership Project, "Technical Specification Group Services and System Aspects; Security architecture and procedures for 5G system (Release 17)," 3GPP TS 33.501 V17.0.0 (Dec. 2020).
Third Generation Partnership Project, "Technical Specification Group Services and System Aspects; Security architecture and procedures for 5G system (Release 16)," 3GPP TS 33.501 V16.0.0 (Sep. 2019).
Third Generation Partnership Project, "Technical Specification Group Services and System Aspects; Security architecture and procedures for 5G system (Release 17)," 3GPP TS 33.501 V17.5.0 (Mar. 2022).
Ericsson, "Summary of Discussion for PCI reconfiguration signaling," 3GPP TSG-RAN WG2 Meeting #110-e, R3-211122, Online (Jan. 25-Feb. 5, 2020).

* cited by examiner

Figure 1C:
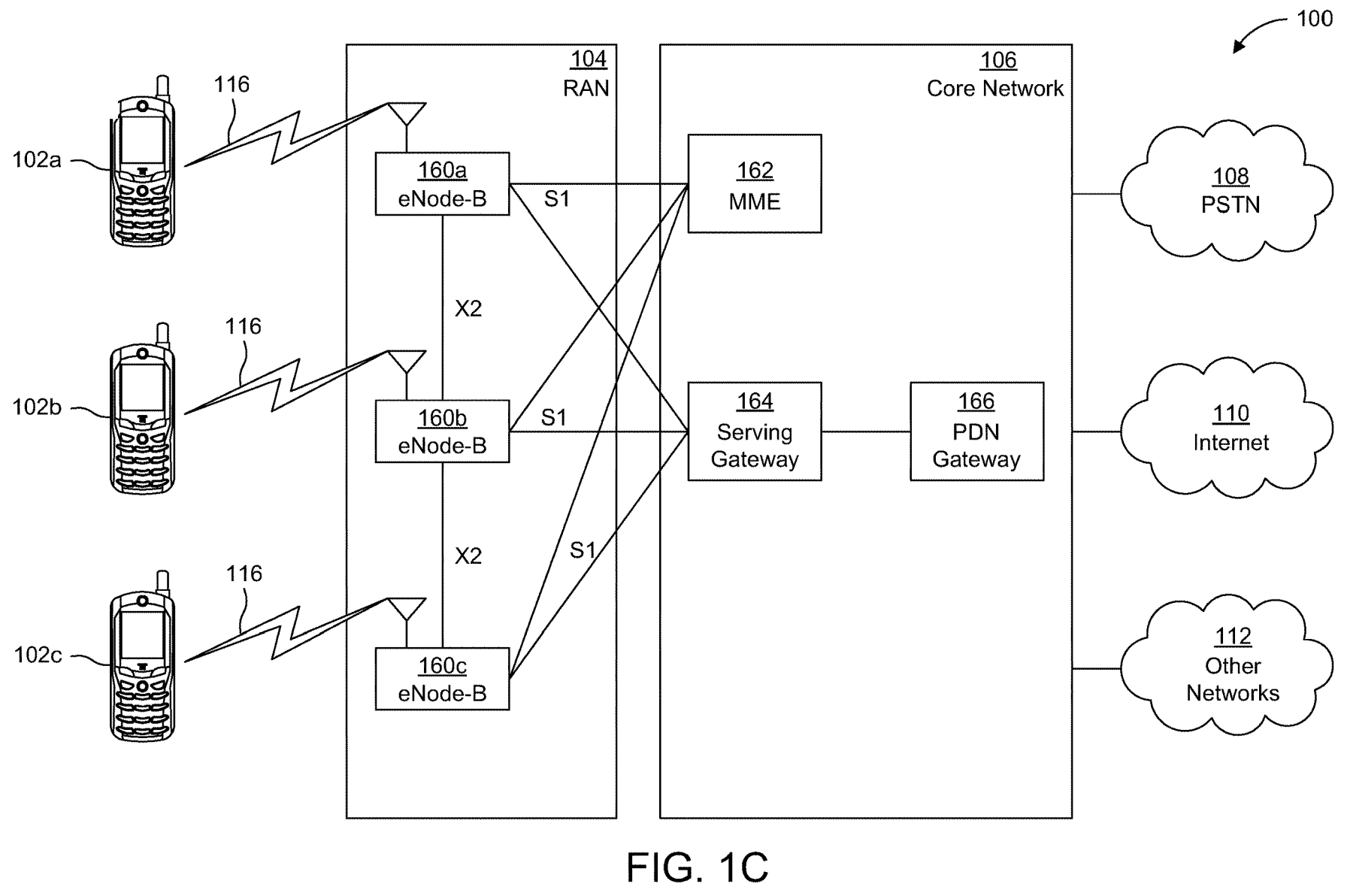

100

108 PSTN

110 Internet

112 Other Networks

106 Core Network

162 MME

164 Serving Gateway

166 PDN Gateway

104 RAN

S1

S1

S1

160a eNode-B 160b eNode-B 160c eNode-B

Figure 1D:
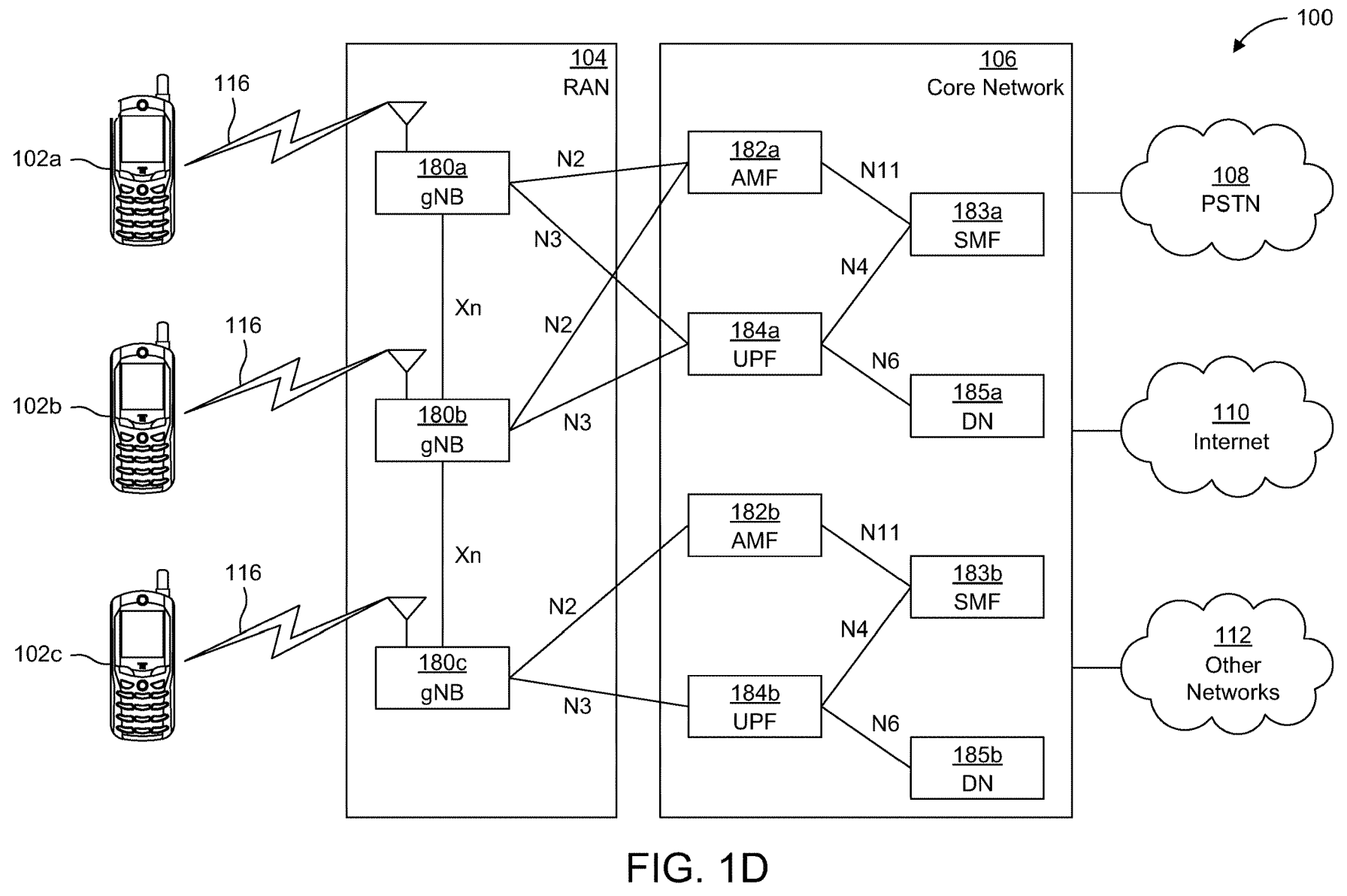

108 PSTN

110 Internet

112 Other Networks

106 Core Network

183a SMF

185a DN

183b SMF

185b DN

N11

N4

N6

N11

N4

N6

182a AMF

184a UPF

182b AMF

184b UPF

104 RAN

N2

N3

N2

N3

N2

N3

180a gNB

Xn 180b gNB

Xn 180c gNB

```
-- ASN1START
-- TAG-PLM|N- IDENTITYINFOLIST-START

PLMN-IdentityInfoList ::=        SEQUENCE (SIZE (1..maxPLMN)) OF PLMN-IdentityInfo

PLMN-IdentityInfo ::=            SEQUENCE {
   plmn-IdentityList             SEQUENCE (SIZE (1..maxPLMN)) OF PLMN-Identity,
   trackingAreaCode               TrackingAreaCode                 OPTIONAL,    -- Need R
   ranac                        RAN-AreaCode                      OPTIONAL,    -- Need R
   cellIdentity                  CellIdentity,
   cellReservedForOperatorUse       ENUMERATED {reserved, notReserved},
   ...,
   [[
   iab-Support-r16              ENUMERATED {true}                   OPTIONAL     -- Need S
   ]]
}
-- TAG-PLMN-IDENTITYINFOLIST-STOP
--ASN1STOP
```

```
--ASN1START
-- TAG-CELLIDENTITY-START
CellIdentity ::=                    BIT STRING (SIZE (36))


-- TAG-CELLIDENTITY-STOP
--ASN1STOP
```

FIG. 5

METHOD AND APPARATUS FOR EFFICIENT HANDLING OF THE UPDATES OF SERVING/NEIGHBOR CELL INFORMATION

CROSS-REFERENCE TO RELATED APPLICATIONS

This application is the U.S. National Stage, under 35 U.S.C. § 371, of International Application No. PCT/US2022/022466 filed Mar. 30, 2022, which claims the benefit of U.S. Provisional Application No. 63/168,167, filed Mar. 30, 2021, the contents of which are incorporated herein by reference.

BACKGROUND

Integrated access and backhaul (IAB), where part of the wireless spectrum is used for the backhaul connection of base stations instead of fiber, allows a more flexible and cheaper deployment of dense networks as compared to deployments where there is a dedicated fiber link to the base stations. A full-fledged, multi-hop, IAB solution that is based on split architecture (i.e., Centralized Unit (CU) and Distributed Unit (DU) architecture) has been specified for NR.

SUMMARY

A wireless transmit/receive unit (WTRU) operating in CONNECTED mode may be configured to receive an indication/configuration from a network regarding changes in information related to the serving cell's identity (e.g., physical cell identity (PCI), cell global identity (CGI), etc.), which may contain additional information such as the conditions when this change becomes effective (e.g., delta time or specific slot/frame). Upon the reception of this indication, and if a condition is also specified, fulfillment of the condition, the WTRU may consider the new PCI/CGI as the serving cell's PCI/CGI, consider the old PCI as belonging to a neighbor cell, and/or update the security keys that are used for encryption and integrity protection based on the new PCI.

A WTRU that is operating in CONNECTED mode, after detecting a change in serving cell information according to example solutions above and updating the security keys, may be configured to use the new security keys for encrypting/decrypting and integrity protection/verification of UL/DL packets in the PDCP in one of the following ways: (1) use the new keys for the UL (i.e., encryption and integrity protection) immediately after the computation of the new keys; (2) use the new keys for the DL (i.e. decryption and integrity verification) immediately after the computation of the new keys; (3) use the new keys for the UL (i.e., encryption and integrity protection) a specified duration (e.g., delta time from the computation of the keys, specific frame/slot number, etc.) after the computation of the new keys; (4) use the new keys for the DL (i.e. decryption and integrity verification) a specified duration (e.g., delta time from the computation of the keys, specific frame/slot number, etc.) after the computation of the new keys; and/or (5) keep using the old keys in the UL and DL, until a reception of a DL packet that is not associated with the new key (e.g., integrity verification with the old key fails, but integrity verification with the new key succeeds).

A WTRU that is operating in CONNECTED mode, may be configured to receive an indication/configuration from the network regarding changes in information related to a neighbor cell's identity (e.g., PCI, CGI, etc.), which may contain additional information such as the conditions when this change becomes effective (e.g., delta time or specific slot/frame). The WTRU, upon the reception of this indication (or if a condition is also specified, from the fulfillment of the condition), may consider the new PCI/CGI as the neighbor cell's PCI/CGI and/or may update the measurements associated with the neighbor cell to reflect the change in PCI (e.g., change the cell identity index in the measurement report from the old PCI to the new PCI).

A WTRU that is operating in CONNECTED mode may receive configuration information from the network indicating a set of equivalent identities for the serving cell (e.g., list of PCIs, list of CGIs, etc.). If the WTRU is not able to detect the current PCI associated with the serving cell (e.g., in the SSBs it is measuring), the WTRU may be configured to not consider a radio link failure and instead try to detect the other equivalent PCIs. Upon the detection of one of the equivalent PCIs, the WTRU may be configured to consider the new PCI as the serving cell's PCI, consider the old PCI as belonging to a neighbor cell, and/or updates the security keys that are used for encryption and integrity protection based on the new PCI.

A WTRU that is operating in INACTIVE mode, may be configured such that upon being suspended to INACTIVE state, to receive a RAN notification area (RNA). Further, while in INACTIVE state, the WTRU may be configured to receive an indication (e.g., broadcast signaling) from the network indicating a change of the identity of the cell that the WTRU is currently camping on (e.g., PCI, CGI, TAC, etc.). The WTRU may be configured to refrain from triggering RAN area update (RANU), even if the new PCI/TAC is not in the WTRU's RNA configuration and/or updates the RNA configuration to include the new PCI/TAC.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 4 illustrates an IE PLMN-IdentityInfoList that includes a list of PLMN identity information;

FIG. 5 illustrates IE CellIdentity which may be used to unambiguously identify a cell within a PLMN;

DETAILED DESCRIPTION

Figure 1A:
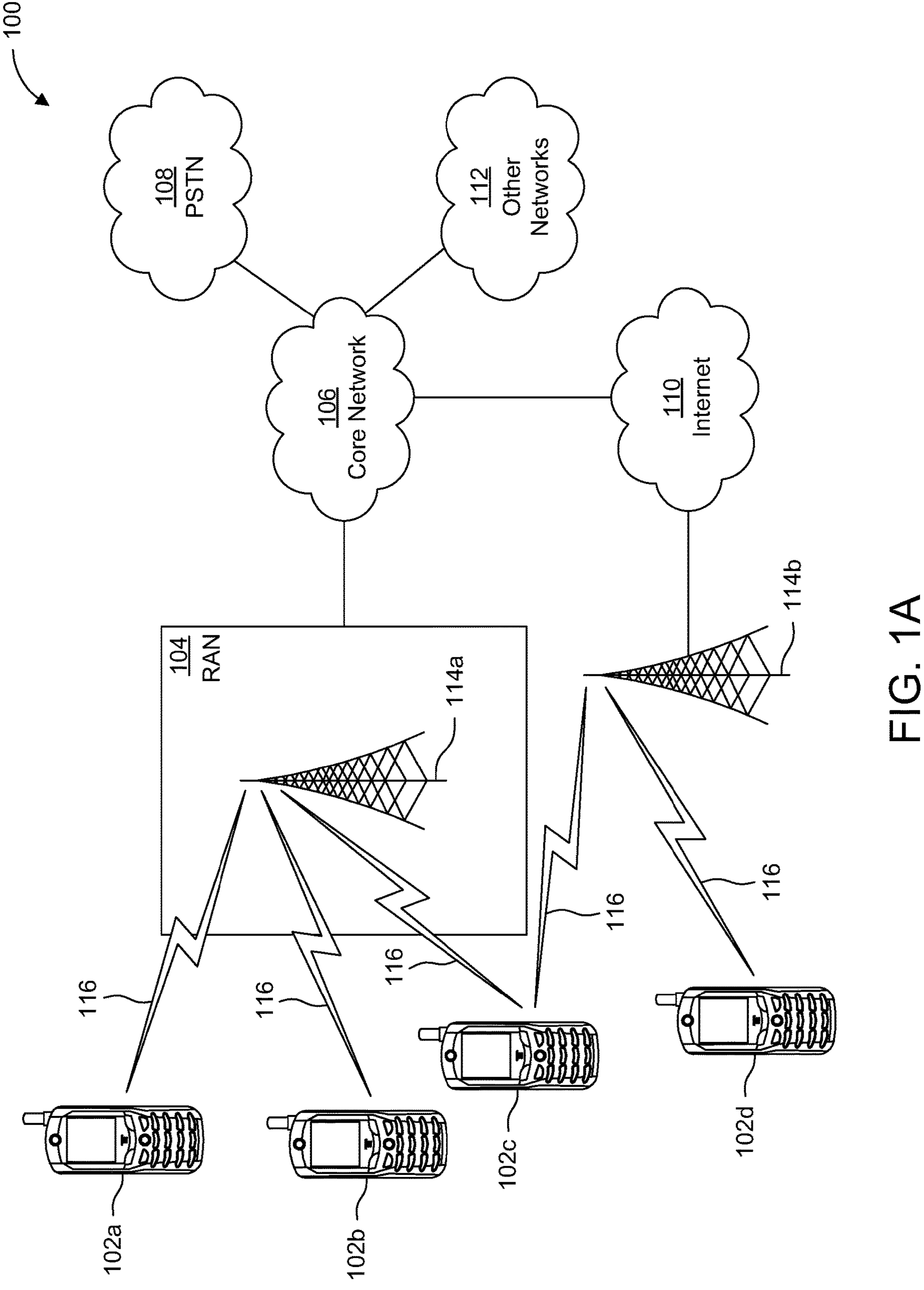
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station **114*a* and the WTRUs 102*a*, 102*b*, 102*c*** may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station **114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106**.

The RAN 104 may be in communication with the CN 106, which may be any type of network configured to provide voice, data, applications, and/or voice over internet protocol (VoIP) services to one or more of the WTRUs **102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106** may also be in communication with another RAN (not shown) employing a GSM, UMTS, CDMA 2000, WiMAX, E-UTRA, or WiFi radio technology.

The CN 106 may also serve as a gateway for the WTRUs **102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104** or a different RAT.

Some or all of the WTRUs **102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b***, which may employ an IEEE 802 radio technology.

Figure 1B:
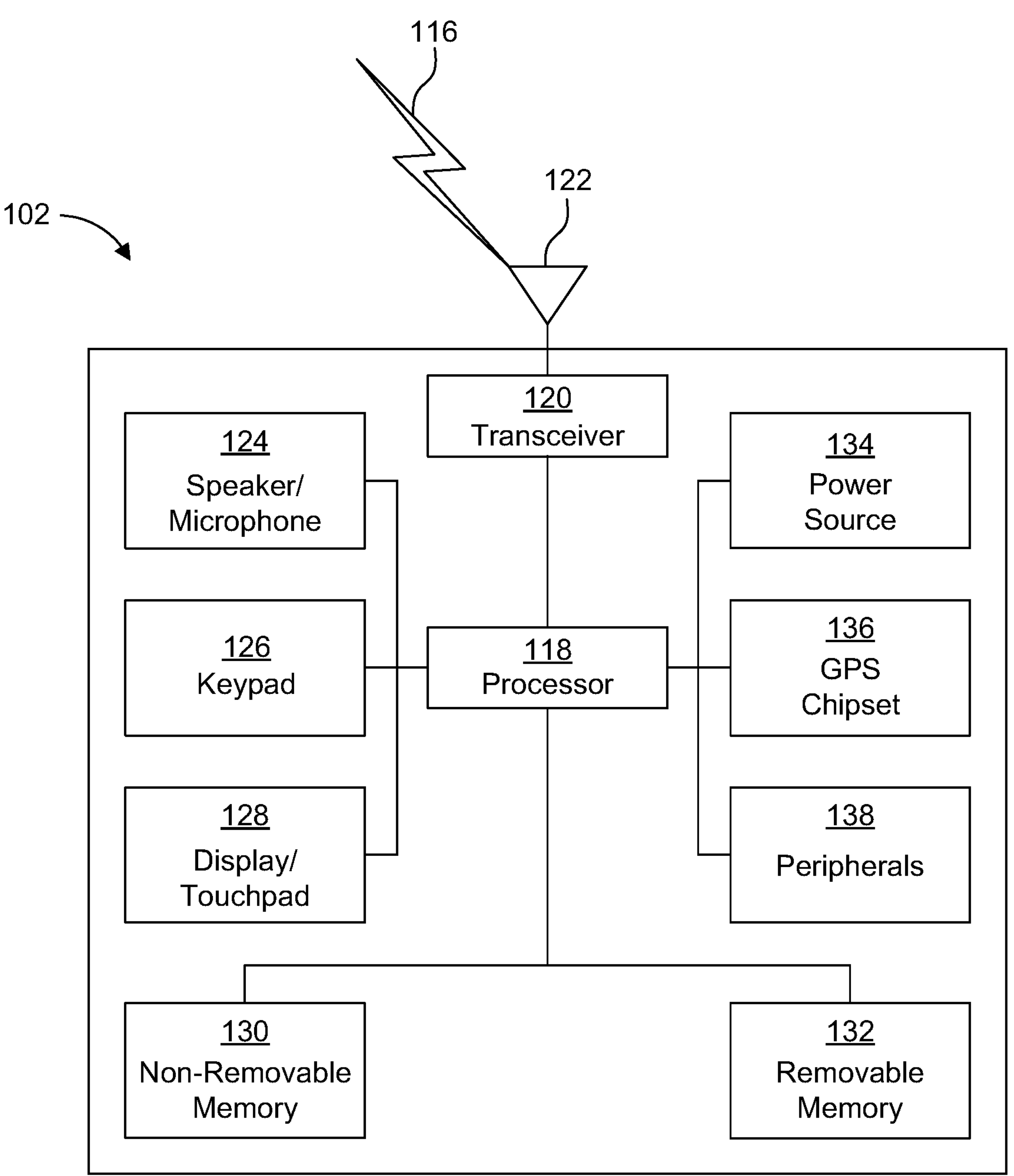
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station **114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122** may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHz, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As discussed above, integrated access and backhaul (IAB), where part of the wireless spectrum is used for the backhaul connection of base stations instead of fiber, allows a more flexible and cheaper deployment of dense networks as compared to deployments where there is a dedicated fiber link to the base stations. A full-fledged, multi-hop, IAB solution that is based on split architecture (i.e. Centralized Unit (CU) and Distributed Unit (DU) architecture) has been specified for NR.

Figure 2:
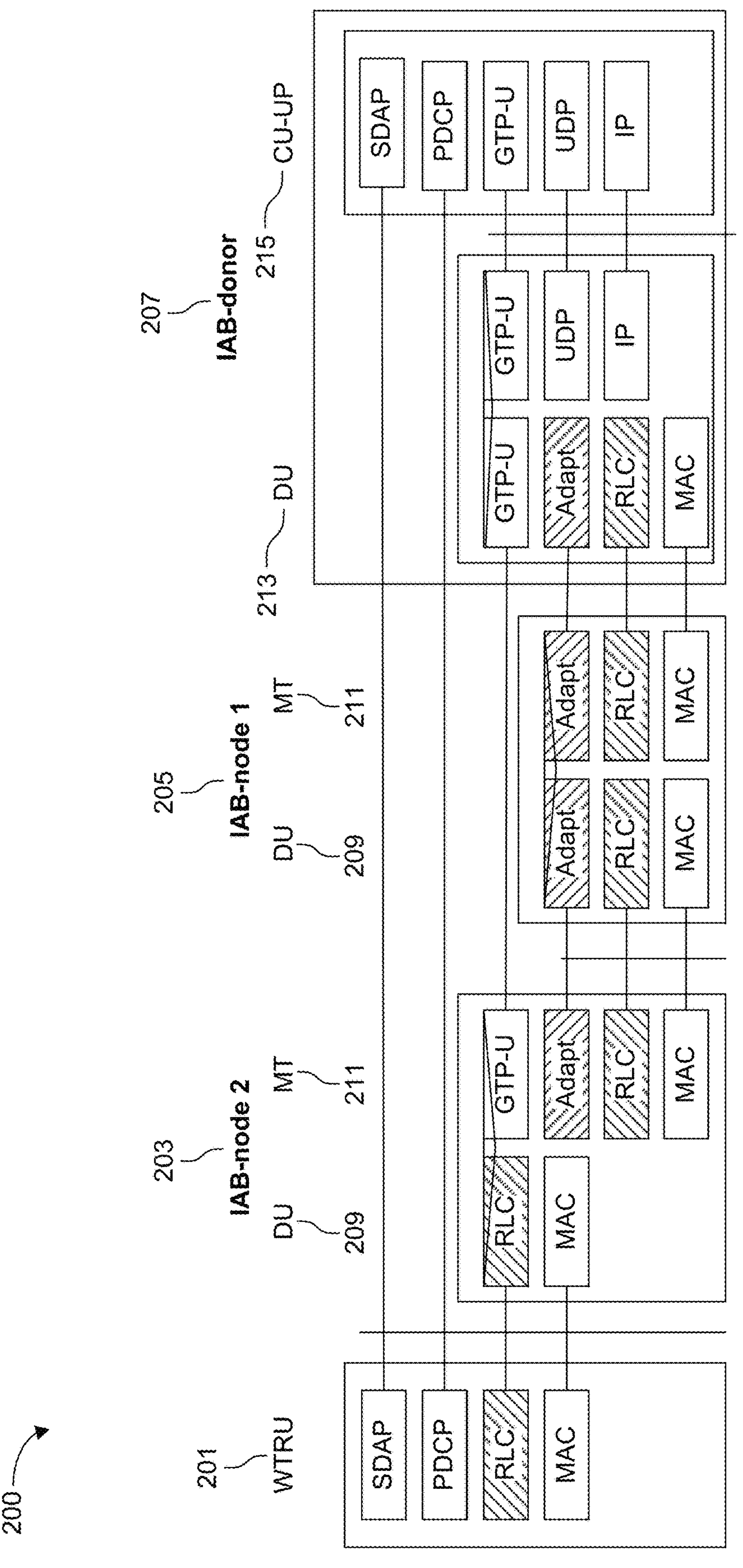
FIG. 2 is a diagram of an integrated access and backhaul (IAB) user plane, according to an embodiment.
Figure 3:
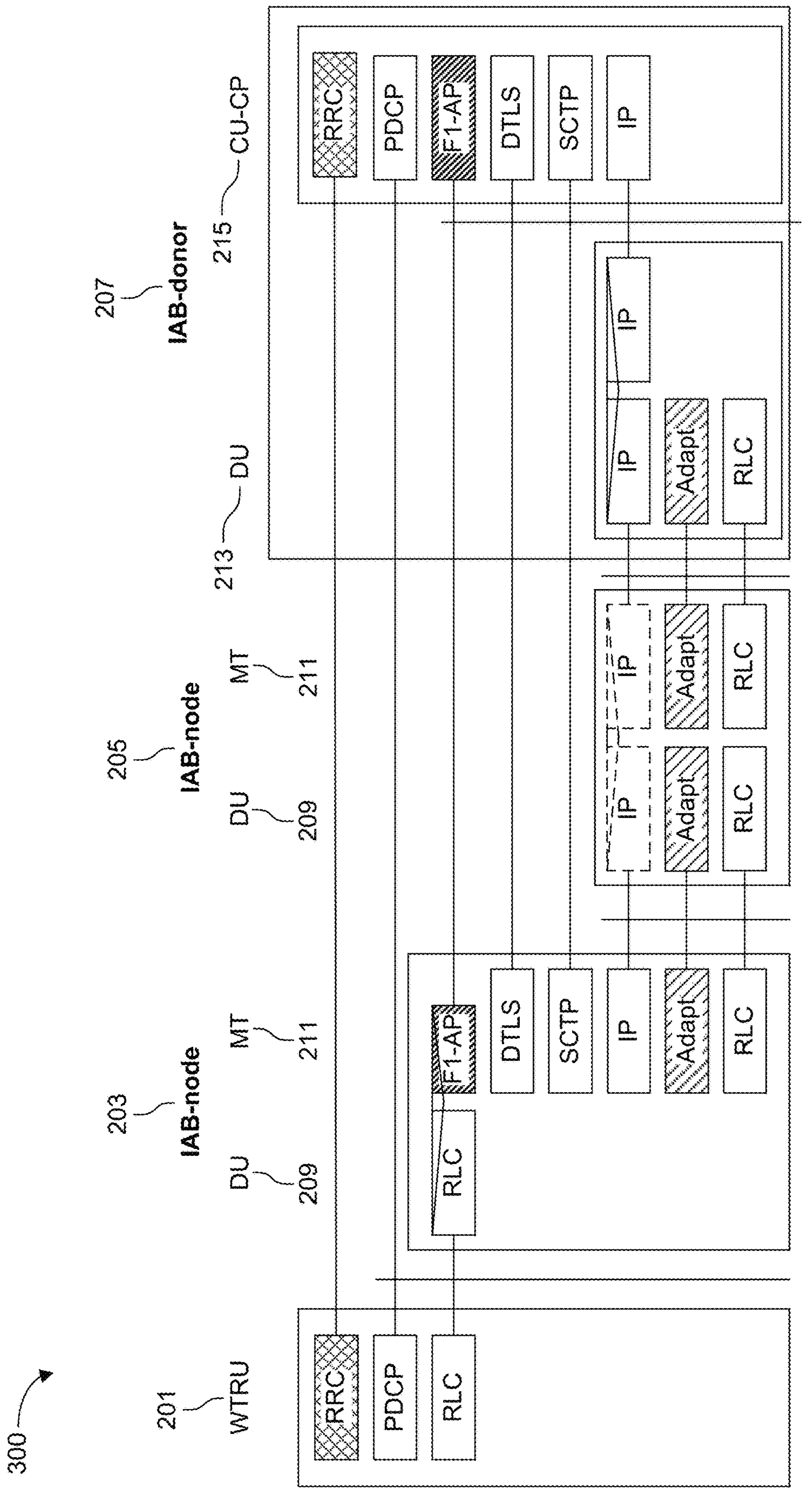
FIG. 3 is a diagram of an IAB control plane, according to an embodiment.

FIG. 2 illustrates an IAB user plane (UP) protocol architecture 200, according to an embodiment. FIG. 3 illustrates an IAB control plane (CP) protocol architecture 300, according to an embodiment. The UP architecture 200 and the CP architecture 300 may comprise a mobile termination (MT) part 211, which may be used to communicate with a parent node, and a DU part 209, which may be used to communicate with a child node or a normal WTRU (e.g., WTRU 201). Both the UP and CP architectures may employ a routing/forwarding approach inspired by IP networks, where each IAB node is assigned an IP address that is routable from a donor base station (and associated L2 addresses), and intermediate IAB nodes forward the packets transparently based on route identifiers/destination addresses. The IAB node may terminate the DU functionality. A base station, which may be referred to as an IAB-donor 207, may terminate the CU functionality 215. Thus, the IAB node and donor CU 215 may form one logical base station unit employing CU/DU split architecture regardless of how many hops apart the IAB node and donor CU are physically from each other. The IAB node serving a WTRU (e.g., IAB node 203 serving WTRU 201 in FIG. 2), may be referred to as the access IAB node while the nodes between the IAB donor DU and the access IAB node (e.g., IAB node 205 in FIG. 2) may be referred to as intermediate IAB nodes. In some embodiments, an IAB node may play the role of both an access IAB node (for the WTRUs that are directly connected to it) and an intermediate IAB node (for WTRUs that are served by its descendant IAB nodes).

Hop-by-hop RLC may be used between the IAB nodes, instead of an End to End (E2E) RLC between the donor DU 213 and the WTRU 201. An adaption layer, referred to as backhaul adaptation protocol (BAP), may be used to enable efficient multi-hop forwarding. The IAB-donor 207 may assign a unique L2 address (BAP address) to each IAB node that it controls (e.g., IAB node 203 and IAB node 205). In case of multiple paths, multiple route IDs may be associated to each BAP address. The BAP of the origin node (IAB-donor DU for the DL traffic, and the access IAB node for the UL) may add a BAP header to packets they are transmitting, which may include a BAP routing ID (e.g., BAP address of the destination/source IAB node and the path ID). If a packet arrives that has a BAP routing ID that contains a BAP address that is equal to the IAB nodes BAP address, it knows the packet is destined for it and passes it on to higher layers for processing (i.e., an F1-C/U message destined for the IAB node's DU, an F1-C message that contains SRB data for a WTRU directly connected to the IAB node, or an F1-U message that contains DRB data for a WTRU directly connected to the IAB node). Otherwise, the IAB node may employ routing/mapping tables to determine where to forward the data to. Each IAB node may have a routing table (configured by the IAB donor CU) containing the next hop identifier for each BAP routing ID. Separate routing tables are kept for the DL and UL direction, where the DL table is used by the DU part of the IAB node, while the MT part of the IAB node uses the UL table.

Backhaul (BH) RLC channels may be used for transporting packets between IAB nodes (or between an IAB-donor DU and an IAB node). A BH RLC channel configuration contains the associated RLC and logical channel configuration. Either many-to-one (N:1) or one-to-one (1:1) mapping may be performed between WTRU radio bearers and BH RLC channels. N:1 mapping multiplexes several WTRU radio bearers into a single BH RLC channel based on specific parameters, such as QoS profile of the bearers, and is suitable for bearers that do not have very strict requirements such as best effort bearers. The 1:1 mapping, on the other hand, may map each WTRU radio bearer onto a separate BH RLC channel, and is designed to ensure finer QoS granularity at WTRU radio bearer level. 1:1 mapping is suitable for bearers with strict throughput or/and latency requirements, such as GBR (Guaranteed Bit Rate) bearers or VoIP bearers.

When an IAB node detects a BH radio link failure (RLF), the IAB node may send a BH RLF indication (which is a BAP control PDU) to its descendant nodes. Upon receiving such an indication form a parent node, the IAB node may initiate procedures such as re-establishment to another parent or pause transmission/reception with the concerned parent.

In a multi-hop IAB network, data congestion may occur on intermediate IAB node, which may lead to packet drops if left unresolved. Though higher layer protocols such as TCP may be used to assure reliability, TCP congestion avoidance and slow start mechanisms may be very costly to overall end to end performance (e.g., throughput degradation). Therefore, IAB networks employ flow control. For the DL, both end-to-end (E2E) and hop-by-hop (H2H) flow control mechanisms are available.

The DL E2E flow control may be based on the DL Data Delivery Status (DDDS) specified for CU/DU split architecture. In DDDS, the DU (in the context of IAB networks, the DU part of the access IAB node) reports to the CU (in the context of IAB networks, the donor CU, specifically, the CU-UP) information such as the desired buffer size per DRB, desired data rate per DRB, the highest successfully delivered PDCP SN, lost packets (i.e. not ACKed by the DU at RLC level), etc. In some embodiments, only access IAB nodes perform DDDS (i.e., IABs report only information concerning the DRBs of the WTRUs that they are directly serving) and no information is provided regarding the BH RLC channels.

For DL H2H flow control, an IAB node generates a flow control message (which is also a BAP control PDU) when its buffer load exceeds a certain level or when it receives a flow control polling message from a peer BAP entity (e.g., a child node). In some embodiments, the H2H flow control information indicates the available buffer size and may be at the granularity of BH RLC channels (e.g., available buffer=value_1 for BH RLC channel #1, available buffer=value_2 or per BH RLC channel #2, etc.) or destination routing ID (e.g., available buffer=value_1 for destination routing ID=address1, available buffer=value2 for destination routing ID=addres2, etc.). The node receiving the flow control message may use the information to control the traffic flow towards the sender (e.g., throttle or pause the traffic associated with certain BH RLC channel or/and destination if the flow control message indicated a low available buffer for the concerned traffic, increase the traffic flow if the flow control was indicating a high available buffer value, etc). The exact actions taken on flow control and the configurations/values of thresholds and other parameters to trigger flow control message (e.g., buffer threshold values, polling timers, etc.) may be left to IAB/network implementation.

Pre-emptive buffer status reporting (BSR) has been specified, where an IAB node may trigger BSR to its parent node(s) even before new data has arrived in its UL buffer, based on the BSR that it has received from its child nodes or WTRUs, or scheduling grants it has provided to them (i.e. an indication of anticipated data). Legacy NR mechanisms are applied where an IAB node controls the flow of UL data from its children nodes and WTRUs by the providing them with proper UL scheduling grants based on the BSR received from them. In some embodiments, IAB nodes are static nodes. However, handover of IAB nodes (also referred to as migration or relocation) from one donor to another is supported for load balancing and also for handling radio link failures (RLFs) due to blockage, e.g., due to moving objects, such as vehicles, seasonal changes (foliage), or infrastructure changes (new buildings). Intra-donor CU handover is supported (i.e. the target and the source parent DUs of the IAB node are controlled by the same donor CU) and inter-donor CU handover is expected to be specified.

IAB connectivity via MR-DC is supported. For example, an IAB node may be connected to the network via EN-DC, where the master node is an LTE node and the secondary node is an NR node.

In some embodiments, from a WTRU's point of view, IAB nodes appear to be normal base stations).

The master information block (MIB) may be transmitted on the broadcast channel (BCH) with a periodicity of 80 ms and repetitions made within 80 ms and it includes parameters that are needed to acquire SIB1 from the cell. The first transmission of the MIB is scheduled in subframes and repetitions are scheduled according to the periodicity of the SSB (synchronization signal block).

Two types of synchronization signals are defined for NR: primary synchronization signal (PSS) and the Secondary Synchronization Signal (SSS). The synchronization signal/PBCH block (SSB) includes a PSS, SSS and Physical Broadcast Channel (PBCH).

The WTRU may identify each cell via the physical-layer cell identity (PCI), which is derived from the PCI group number included in the SSS and the physical layer identity included in the PSS. There are 1008 unique PCIs defined in 5G NR, double of that in LTE (504). The NR PCIs are divided into 336 unique PCI groups and each group including three different identities.

Limiting the number of PCIs makes the initial PCI detection by the WTRUs during cell search easier. However, the limited number of PCIs inevitably leads to the reuse of the same PCI values in different cells controlled by different gNBs. Therefore, a PCI might not uniquely identify a neighbor cell, and each cell additionally broadcasts, as a part of the system information (SI), a globally unique cell global identifier (CGI). The CGI is constructed from the PLMN identity the cell belongs to and the NR Cell Identity (NCI) of the cell. The gNB Identifier (gNB ID) is contained with the NCI and is used to identify the gNBs within a PLMN.

When a new base station is brought into the field, a PCI needs to be selected for each of its supported cells. The PCI assignment may fulfill the following two conditions: Collision-free and confusion-free. In collision-free, the PCI may be unique in the area that the cell covers for a given carrier frequency. In confusion-free, a cell may not have more than one neighboring cell with identical PCI that are using the same carrier frequency Using an identical PCI for two neighboring cells may create collision. Such a collision means that a WTRU moving from one of the cells to the other may fail to detect the candidate cell since it cannot detect a new PCI. In fact, the reception situation is similar to the case when the WTRU receives multiple copies of a transmitted signal that has traveled along different paths. A PCI collision may be solved only by restarting at least one of the cells and reassigning it a different PCI, causing service interruption for all the WTRUs that were connected to it.

PCI confusion, on the other hand, may occur if the cells using the same PCI are not neighboring each other but have a common neighbor. Thus, handover measurements, which are based on the PCI, may become ambiguous leading to confusing measurement reports. This may lead to handover failures (HOF) or even Radio Link Failure (RLF).

Traditionally, a proper PCI is derived from radio network planning and is part of the initial configuration of the node. The network planning tool calculates the possible PCIs for the new cell(s) based on estimated neighbor relations of the new cells, as estimated by cell coverage area predictions. However, prediction errors, due to imperfections in map and building data, and to inaccuracies in propagation models, have forced operators to resort to drive/walk tests to ensure proper knowledge of the coverage region and identify all relevant neighbors and handover regions. The drive/walk tests may also be inaccurate, as some factors such as seasonal changes (the falling of leaves or snow melting) may alter the propagation conditions. In addition, the inaccuracy of cell coverage and neighbor relation assessment increases with time as the live network and its surroundings evolve.

NR supports a feature known as WTRU Automatic Neighbor Relations (ANR), which enables the serving gNB to request the WTRU to decode and report the CGI of a given cell associated with a given PCI.

In SIB1, a cell broadcasts the CellAccessRelatedInfo IE, which includes the PLMN-IdentityInfoList. FIG. 4 illustrates an IE PLMN-IdentityInfoList, according to an embodiment. The IE PLMN-IdentityInfoList 400 includes a list of PLMN identity information. FIG. 5 illustrates IE CellIdentity 500, according to an embodiment, which may be used to unambiguously identify a cell within a PLMN.

Each gNB in the network may need information about its neighbor gNBs and the cells hosted by the neighbors, primarily for handover and dual connectivity purposes.

WTRUs may use PCIs to identify cells, as well as to report measurement results. If the gNB receives a measurement report from a WTRU that includes a PCI that it does not recognize, it may request the WTRU read the CGI from SIB1 of the concerned cell. From the CGI report (i.e., gNB id included in the CGI), the gNB may be able to identify the gNB hosting the cell. If there is a possibility to setup an x2/xn connection with that neighbor, the gNB may initiate the establishment of such a connection, if not done already.

gNBs may maintain neighbor relations tables (NRTs) that contain information such as the PCI/CGI of neighboring cells/nodes as well as information such as whether a direct X2/Xn connection is available towards that neighbor. When there is a need for handover (e.g., a WTRU sends a measurement result indicating that it has a better signal from a cell with a certain PCI), the gNB may then lookup the gNB controlling that cell from the NRT, determine the handover type available (e.g., directly via X2/Xn, CN based handover via S1/NG, etc.), and send the appropriate HO request to it.

RRC_INACTIVE is a state where a WTRU remains in CM-CONNECTED and may move within an area configured by NG-RAN, the RAN notification area (RNA), without notifying NG-RAN. The RRC_INACTIVE state is a compromise between the ACTIVE/CONNECTED state and the IDLE state, where the WTRU has almost the same power saving benefits of the IDLE state, but may be brought back quickly to connected sate when the need arises (e.g., when UL/DL data concerning that WTRU arrives).

When a WTRU is suspended to an INACTIVE state, it may be allocated an I-RNTI by the last serving gNB. The I-RNTI may include a WTRU specific part (e.g., CRNTI used in the cell where the WTRU got suspended) and a network specific part (e.g., ID of the gNB that was hosting the cell where the WTRU got suspended). The last serving gNB node keeps the WTRU context and the WTRU-associated NG connection with the serving AMF and UPF.

A WTRU in the RRC_INACTIVE state may be configured by the last serving gNB with an RNA, where: (1) the RNA may cover a single or multiple cells, and may be contained within the CN registration area; and/or (2) a RAN-based notification area update (RNAU) is periodically sent by the WTRU and is also sent when the cell reselection procedure of the WTRU selects a cell that does not belong to the configured RNA.

The RNAU may be performed via a two-step resume procedure. For example, in some embodiments, a WTRU may send an RRC Resume Request with a cause value indicating RANU, and the network may respond immediately with an RRC Release.

There are several different alternatives on how the RNA may be configured. In some embodiments, a WTRU is provided an explicit list of one or more cells that constitute the RNA.

In other embodiments, a WTRU is provided at least one RAN area ID, where the at least one RAN area is a subset of a CN Tracking Area (TA) or equal to a CN TA. A RAN area is specified by one RAN area ID, which includes a TAC and optionally a RAN area code. A cell broadcasts one or more RAN area IDs in the system information.

If the last serving gNB receives DL data from the UPF or DL WTRU-associated signaling from the AMF the WTRU is in RRC_INACTIVE, it pages in the cells corresponding to the RNA and may send XnAP RAN Paging to neighbor gNB(s) if the RNA includes cells of neighbor gNB(s).

When the WTRU resumes (e.g., in a cell/gNB different from where it was suspended), it may provide the I-RNTI in the resume request and the target gNB may be able to identify the source gNB from the network specific part of the C-RNTI and send the context fetch request to the source node.

The migrations of an IAB node from one parent node to another (possibly involving a change of the donor DU or even donor CU) are specified for load balancing or backhaul RLF handling. Such a migration of an IAB node may also be referred to as topology adaptation.

Figure 6A:
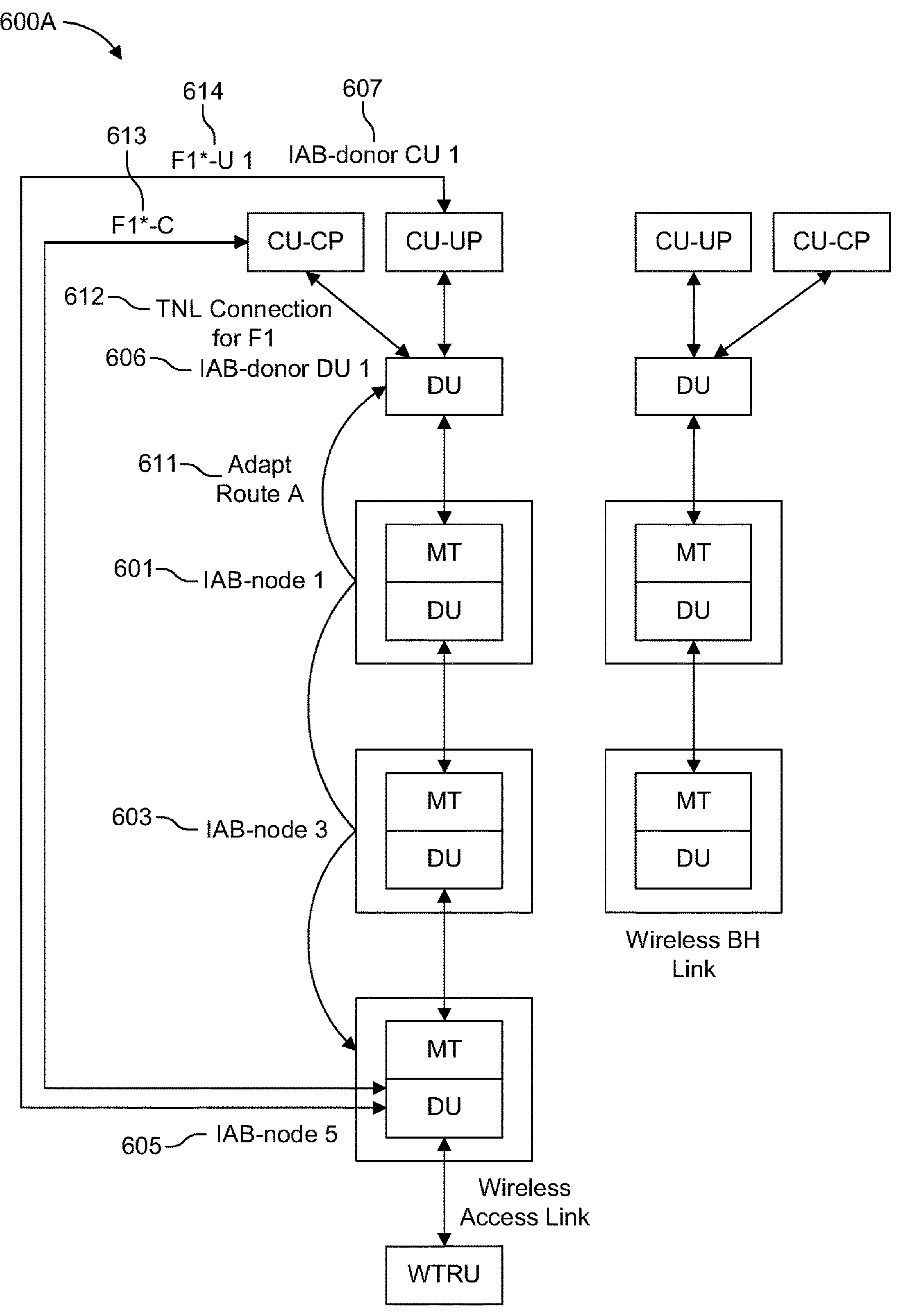
FIGS. 6A and 6B are diagrams of inter-cu IAB topology adaptation, according to an embodiment.
Figure 6B:
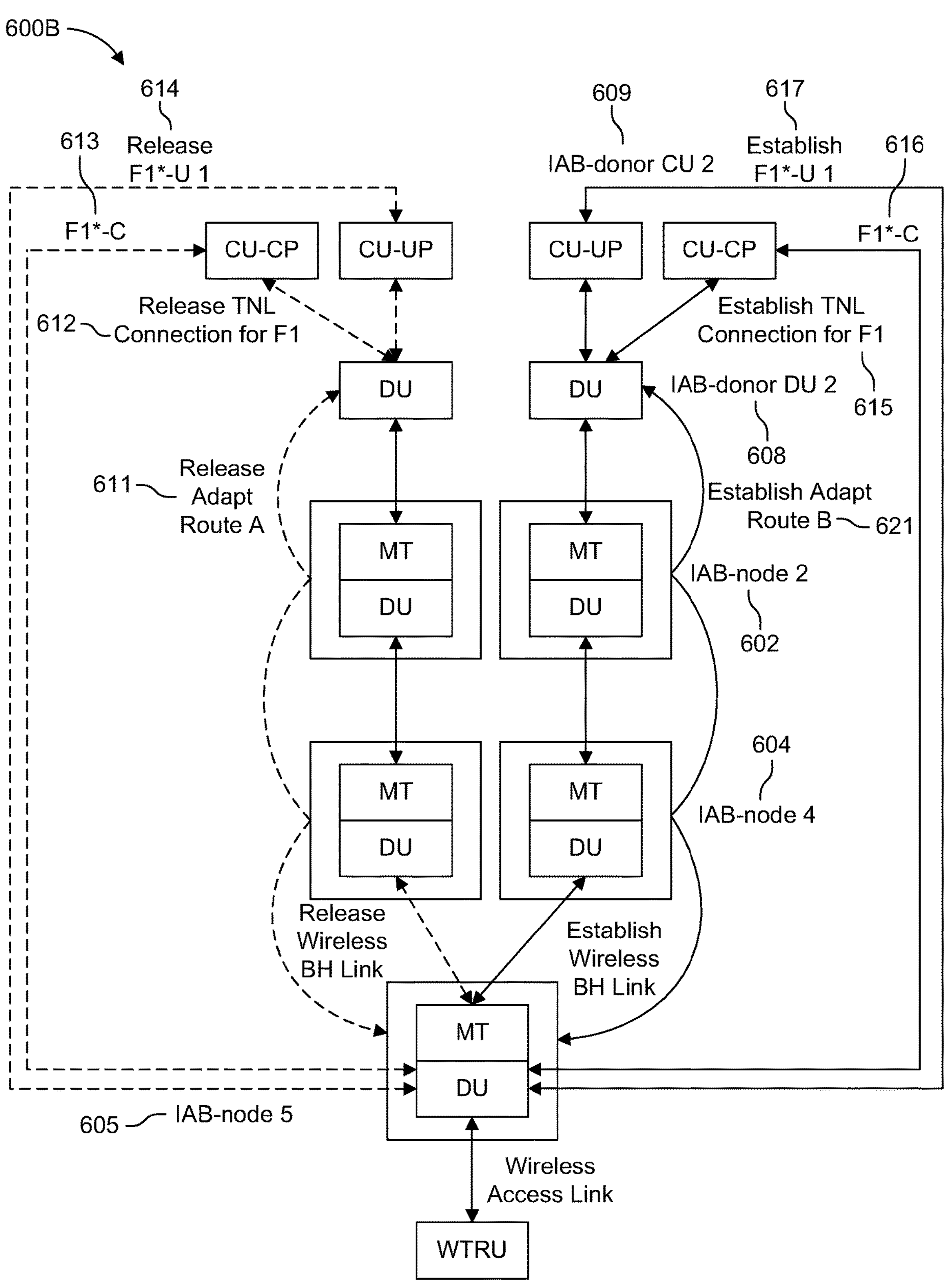

FIGS. 6A and 6B illustrate inter-CU topology adaptation 600A, 600B, according to an embodiment. In some embodiments, topology adaptation may comprise establishment of new route/resources via the new parent CU/path. For example, in the embodiment illustrated in FIG. 6A, adapt route A 611 is established between IAB-node 605, IAN-node 603, IAB-node 601, and IAB-donor DU 606. During the topology adaptation new adapt route B 621 may be established between IAB-node 605, IAB-node 604, IAB-node 602, and IAB-donor DU 608, as illustrated in FIG. 6B.

In some embodiments, topology adaptation may further comprise redirection of F1-U tunnels and F1-AP onto new route. For example, in the embodiment illustrated in FIG. 6A, tunnel connection for F1 612 is established between IAB-donor DU 606 and IAB-donor CU 607; F1-C 613 is established between the DU of IAB-node 605 and the CU-CP of IAB-donor CU 607; and F1-U1 614 is established between the DU of IAB-node 605 and the CU-UP of IAB-donor CU 607, as illustrated in FIG. 6A. Tunnel connection for F1 612 may be redirected to tunnel connection for F1 615 between IAB-donor DU 608 and IAB-donor 609. Similarly, F1-C 613 and F1-U1 614 may be redirected to F1-C 616 and F1-C 617, as illustrated in FIG. 6B.

In some embodiments, topology adaptation may further comprise the release of old route/resources. For example, the following routes/resources are released in the embodiment illustrated in FIG. 6B: adapt route A 611, tunnel connection for F1 612, F1-C 613, and F1-U1 614.

Figure 7:
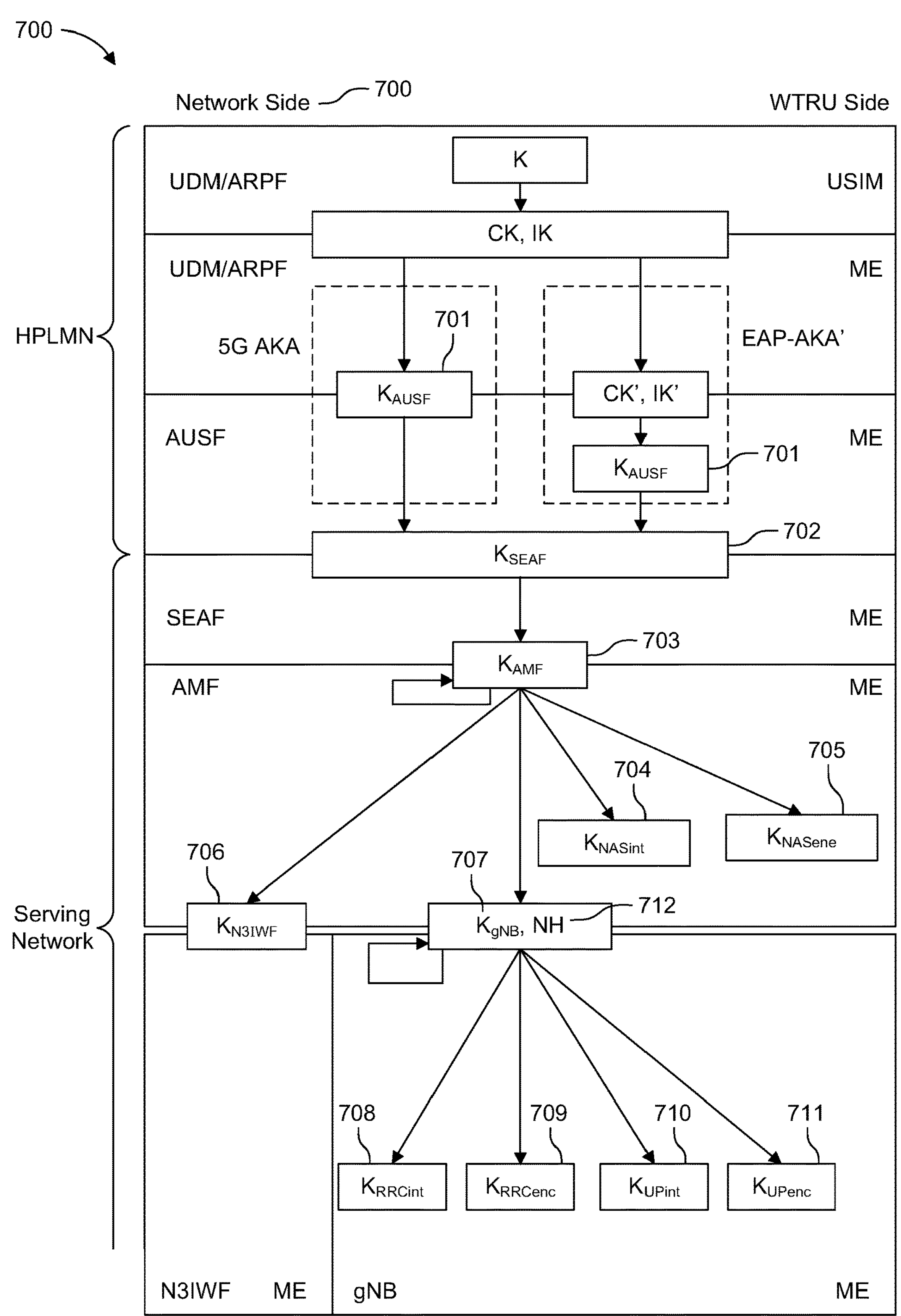
FIG. 7 is a diagram of keys of the key hierarchy generation in NR, according to an embodiment.

FIG. 7 illustrates the keys of the key hierarchy generation in NR 700, according to an embodiment. As shown in FIG. 7, the key hierarchy may include the following keys: $K_{AUSF}$ 701, $K_{SEAF}$ 702, $K_{AMF}$ 703, $K_{NASint}$ 704, $K_{NASenc}$ 705, $K_{N3IWF}$ 706, $K_{gNB}$ 707, $K_{RRCint}$ 708, $K_{RRCenc}$ 709, $K_{UPint}$ 710 and $K_{UPenc}$ 711. Discussed below are the keys that are related to the access stratum.

$K_{gNB}$ 707 may be a key derived by ME and AMF from $K_{AMF}$ 703. $K_{gNB}$ 707 is further derived by ME and source gNB when performing horizontal or vertical key derivation. The $K_{gNB}$ 707 may be used as $K_{eNB}$ (not shown) between ME and ng-eNB.

$K_{UPenc}$ 711 may be a key derived by ME and gNB from $K_{gNB}$ 707, which may be used for the protection of UP traffic with a particular encryption algorithm.

$K_{UPint}$ 710 may be a key derived by ME and gNB from $K_{gNB}$ 707, which may be used for the protection of UP traffic between ME and gNB with a particular integrity algorithm.

$K_{RRCint}$ 708 may be a key derived by ME and gNB from $K_{gNB}$ 707, which may be used for the protection of RRC signaling with a particular integrity algorithm.

$K_{RRCenc}$ 709 may be a key derived by ME and gNB from $K_{gNB}$ 707, which may be used for the protection of RRC signaling with a particular encryption algorithm.

Next hop parameter (NH) 712 may be a key derived by ME and AMF to provide forward security.

$K_{NG\text{-}RAN}$*($K_{gNB*}$ if the target is a gNB or $K_{eNB*}$ if the target is an eNB) may be a key derived by ME and NG-RAN (i.e., gNB or ng-eNB) when performing a horizontal or vertical key derivation When an initial AS security context needs to be established between the WTRU and gNB, AMF and the WTRU derive a $K_{gNB}$ and a NH. The $K_{gNB}$ and the NH may be derived from the $K_{AMF}$. A NH Chaining Counter (NCC) may be associated with each $K_{gNB}$ and NH parameter. Every $K_{gNB}$ may be associated with the NCC corresponding to the NH value from which it was derived. At initial setup, the $K_{gNB}$ may be derived directly from $K_{AMF}$, and then may be considered to be associated with a virtual NH parameter with NCC value equal to zero. At initial setup, the derived NH value may be associated with the NCC value one. On handovers, the basis for the $K_{gNB}$ that may be used between the WTRU and the target gNB, called $K_{gNB^*}$, is derived from either the currently active $K_{gNB}$ or from the NH parameter. If $K_{gNB^*}$ is derived from the currently active $K_{gNB}$, this is referred to as a horizontal key derivation and is indicated to WTRU with an NCC that does not increase. If the $K_{gNB^*}$ is derived from the NH parameter, the derivation is referred to as a vertical key derivation and is indicated to WTRU with an NCC increase. Finally, $K_{RRCint}$, $K_{RRCenc}$, $K_{UPint}$ and $K_{UPenc}$ may be derived based on $K_{gNB}$ after a new $K_{gNB}$ is derived.

With such key derivation, a gNB with knowledge of a $K_{gNB}$, shared with a WTRU, may be unable to compute any previous $K_{gNB}$ that has been used between the same WTRU and a previous gNB, therefore providing backward security. Similarly, a gNB with knowledge of a $K_{gNB}$, shared with a WTRU, may be unable to predict any future $K_{gNB}$ that may be used between the same WTRU and another gNB after n or more handovers (since NH parameters are only computable by the WTRU and the AMF).

On handovers with vertical key derivation the NH may be further bound to the target PCI and its frequency ARFCN-DL before it is taken into use as the $K_{gNB}$ in the target gNB. On handovers with horizontal key derivation the currently active $K_{gNB}$ may be further bound to the target PCI and its frequency ARFCN-DL before it is taken into use as the $K_{gNB}$ in the target gNB. That is, when deriving the $K_{gNB}$, the PCI and the ARFCN (i.e. absolute frequency of SSB of the target cell), may be used as input to the security key derivation function (KDF).

When an IAB node performs relocation, specifically inter-CU relocation, the PCIs/CGIs of the cells that it is hosting may be changed. In some embodiments, the PCIs/CGIs of the cells that it is hosting may be changed as the DU of the IAB node, and thus the cells hosted by the DU may belong to the target CU. This may lead to several issues as described below.

First, the WTRUs or IAB nodes that are directly connected to the migrating IAB node may detect a new PCI the next time they read the SSBs of their serving cells. Thus, they may consider their serving cell as a neighbor cell, and unable to find an SSB that is broadcasting the PCI associated with their serving cell, may consider this as an RLF and trigger unnecessary re-establishment and may be reconnected to the same cell afterwards. This may cause considerable service interruption to the bearers of the WTRUs that are being directly or indirectly served by the migrating IAB node (e.g., WTRUs served by a child of the migrating IAB node).

Second, the measurement results by WTRUs or IAB MTs that were being served by neighbors of the migrating IAB node and currently measuring the cells of the migrating IAB node may become invalidated as the associated PCI is not detected anymore (e.g., previous results that were collected for the concerned cells may be removed from the measurement results, and subsequent results gathered as if they are for a new cell).

Third, idle or inactive WTRUs or IAB-MTs that are camping in one of the cells of the migrating IAB node may be forced to perform an unnecessary cell re-selection, which could be the same cell as before with the new PCI, or a different cell.

Fourth, idle or inactive WTRUs or IAB-MTs that are camping in one of the cells of the migrating IAB node may be forced to perform an unnecessary RAN area update procedure (e.g., start a two-step resume to let the network know that the inactive WTRU has now moved to a new RAN area), if: (1) the new PCI of the migrating IAB node is not within the list of cells provided in the RAN area list provided to the WTRU or IAB-MT when it was sent to INACTIVE state; or (2) the new TAC of the migrating IAB node is not within the list of TACs provided in the RAN area list provided to the WTRU or IAB-MT when it was sent to INACTIVE state.

The issues described above cover the multi-hop IAB scenario, wherein an IAB node migrates from one parent to another (e.g., inter-CU relocation), resulting on the need for the IAB node's cell information (e.g., PCI, CGI, TAC, etc.) to be updated. However, the embodiments described below are equally applicable to other scenarios (e.g., non IAB scenario with CU/DU split, or a non CU-DU split architecture where the gNB is terminated in one node) where the cell's information/identity need to be changed on the fly (e.g., dynamic PCI update due to detection of PCI collision/confusion).

The terms IAB node, MT part of an IAB node or DU part of an IAB node, and WTRU may be used interchangeably.

Most of the implementation described herein are related to PCI/CGI change. However, the implementation are applicable also to scenarios where the change is related to other network identities such as tracking area identity (TAI), tracking area code (TAC), PLMN identity, etc.

In one implementation, a WTRU may be provided with a configuration update information regarding a change of information of the current serving cell (e.g., PCI, CGI, TAC). After the reception of this information, the WTRU may replace the new information for the serving instead of the old ones. For example, if the update indicates a change of a PCI, the WTRU may not look for the old PCI in the SSBs of the serving cell but instead may check the new PCI. If a WTRU detects an SSB that contains the old PCI, it may consider it as a neighbor cell. In one implementation, the WTRU may consider the change of the serving cell information effective immediately after the reception of the configuration update.

In one implementation, the WTRU may consider the change of the serving cell information effective a certain duration after the reception of the configuration update. The duration could be a certain time (e.g., x ms) after the reception of the update message or it could be an exact time in the future (e.g., frame/slot number). The duration may be included within the configuration update message or it may be after a duration specified in 3GPP standards.

The WTRU may be provided with the serving cell update information via a dedicated signaling (e.g., RRC Reconfiguration, MAC CE) or via broadcast signaling (e.g., SIB).

In one implementation, a WTRU may be provided with a configuration update information regarding a change of information of a neighbor cell (e.g., PCI, CGI, TAC). After the reception of this information, the WTRU may replace the new information for the neighbor cell instead of the old ones. For example, if the update indicates a change of a PCI, the WTRU may update all current measurement results associated/indexed with the old PCI to the new PCI. For example, if a WTRU detects an SSB that contains the old PCI, it may consider it as a new neighbor cell.

In some embodiments, the neighbor cell configuration update contains the old and new (set of) neighbor cell information. For example, the content of a configuration update message may be: (1) {current PCI=PCI_current, new PCI=PCI_new} or (2) {current PCI=PCI_current, new TAC=TAC_new}.

In some embodiments, the neighbor cell configuration update may include the old and new (set of) cell information for multiple cells. For example, [cell_1 info: {current PCI=PCI_current, new PCI=PCI_new}, cell_2 info:{current PCI=PCI_current, new PCI=PCI_new}]

In some embodiments, the WTRU may consider the change of the neighbor cell information effective immediately after the reception of the configuration update.

In some embodiments, the WTRU may consider the change of the neighbor cell information effective a certain duration after the reception of the configuration update. The duration may be a certain time (e.g., x ms) after the reception of the update message or it could be an exact time in the future (e.g., frame/slot number). The duration may be included within the configuration update message or it may be after a duration specified in 3GPP standards. If the configuration contains information for more than one neighbor cell, the same duration may be applied to all the cells included in the update, or a different duration may be included for each cell.

The WTRU may be provided with the neighbor cell update information via a dedicated signaling (e.g., RRC Reconfiguration, MAC CE) or via broadcast signaling (e.g., SIB). Note that in the case of broadcast signaling, the signaling could be from the serving cell or the neighbor cell (e.g., SIB change).

In some embodiments, cells may broadcast more than one set of cell information (e.g., PCI, CGI, TAC), and the WTRU may consider them all equivalent. For example, a cell may indicate in MIB or SIBx (e.g., SIB1) the possible PCIs that it may be associated with. The WTRU may then store all the possible PCIs indicated therein and associate them with the PCI that the cell is broadcasting in the SSB, and from thereon may consider all these PCIs are equivalent.

If the concerned cell is a serving cell, the WTRU, on not being able to detect the PCI that was being used by the current serving cell in the SSB, may try to detect any of the PCIs that it has associated with the cell. If one of them is detected, then that SSB may be considered as the SSB of the serving cell. Otherwise, as in legacy behavior, the WTRU may consider a radio link failure has been detected.

If the concerned cell is a neighbor cell, the WTRU, upon detecting a PCI that is associated with a neighbor cell in an SSB, may associate all previous measurement results associated with the old PCI used by the neighbor cell with the new PCI.

As discussed above, the PCI may be one of the parameters that is used to compute the security key ($K_{gNB}$), and that the $K_{gNB}$ may be used to compute the user plane and control plane security keys that are used by PDCP for encryption and integrity protection (i.e., $K_{UPenc}$, $K_{UPint}$, $K_{RRCenc}$, $K_{RRCint}$).

In some embodiments, the WTRU may continue using the same security keys ($K_{gNB}$, $K_{UPenc}$, $K_{UPint}$ $K_{RRCenc}$, $K_{RRCint}$) as before detecting the PCI change of the serving cell by the reception of the cell configuration update information. Since the network also knows that the change of the PCI of the cell, the gNB may keep using the same keys as before, even though the PCI of the serving cell has changed.

In some embodiments, the WTRU updates the security keys to reflect the change of PCI. That is, it may derive the new $K_{gNB}$ using the new PCI and update the $K_{UPenc}$, $K_{UPint}$, $K_{RRCenc}$, and $K_{RRCint}$, using the newly derived $K_{gNB}$. In some embodiments, the WTRU may immediately start using the newly derived UP and CP encryption and integrity protection keys immediately after the PCI change has become effective.

In some embodiments, the WTRU may try to use both the old and newly derived UP and CP keys for decoding incoming DL packets for a certain duration after the key change. For example, the WTRU may try to use the old keys first and if that doesn't succeed, instead of declaring radio link failure as in the legacy case, it may try to the new keys (or vice versa). This may enable the proper reception of any outstanding packets (e.g., retransmissions) that were sent by the gNB before the change of the PCI and thus encrypted or integrity protected using the old keys. The duration where the WTRU tries to use both the old and the new keys may be included in the cell configuration update information, specified in 3GPP standards, or left to WTRU implementation. For example, the WTRU may stop using the old keys once it has received packets that are integrity protected with the new keys.

It should be noted that one advantage of operating with the two security keys simultaneously for a certain duration after the change of the PCI is that it avoids the need for retransmissions. If a re-establishment or normal HO was triggered due to the change of PCI, the packets that were pending transmission or those that were transmitted but waiting acknowledgement at the gNB may have to be re-encoded with the new security keys and retransmitted (the WTRU may have to do the same for UL packets).

In some embodiments, a WTRU that is INACTIVE mode may refrain from triggering a RAN area update (RANU), upon detecting a PCI/TAC change in the serving cell, even if that PCI/TAC does not belong to the WTRU's RNA configuration, if it notices that the new PCI/TAC belongs to the same serving cell, using any of the solutions discussed above (e.g., from equivalent PCIs, from SIB signaling indicating that the PCI/TAC of the current serving cell has changed, etc).

In some embodiments, a WTRU that is INACTIVE mode, when determining that PCI/TAC of the current serving cell has changed (e.g., SIB signaling indicating the change) or could change (e.g., SIB signaling indicating equivalent PCIs/TACs), the WTRU may update the RNA configuration to include the new PCI/TAC or the possible set of equivalent PCIs/TACs.

In some embodiments, a WTRU that is INACTIVE or IDLE mode may refrain from triggering a cell re-selection procedure, upon detecting a PCI/TAC change in the serving cell, if it notices that the new PCI/TAC belongs to the same serving cell, using any of the solutions discussed above (e.g., from equivalent PCIs, from SIB signaling indicating that the PCI/TAC of the current serving cell has changed, etc.).

Figure 8:
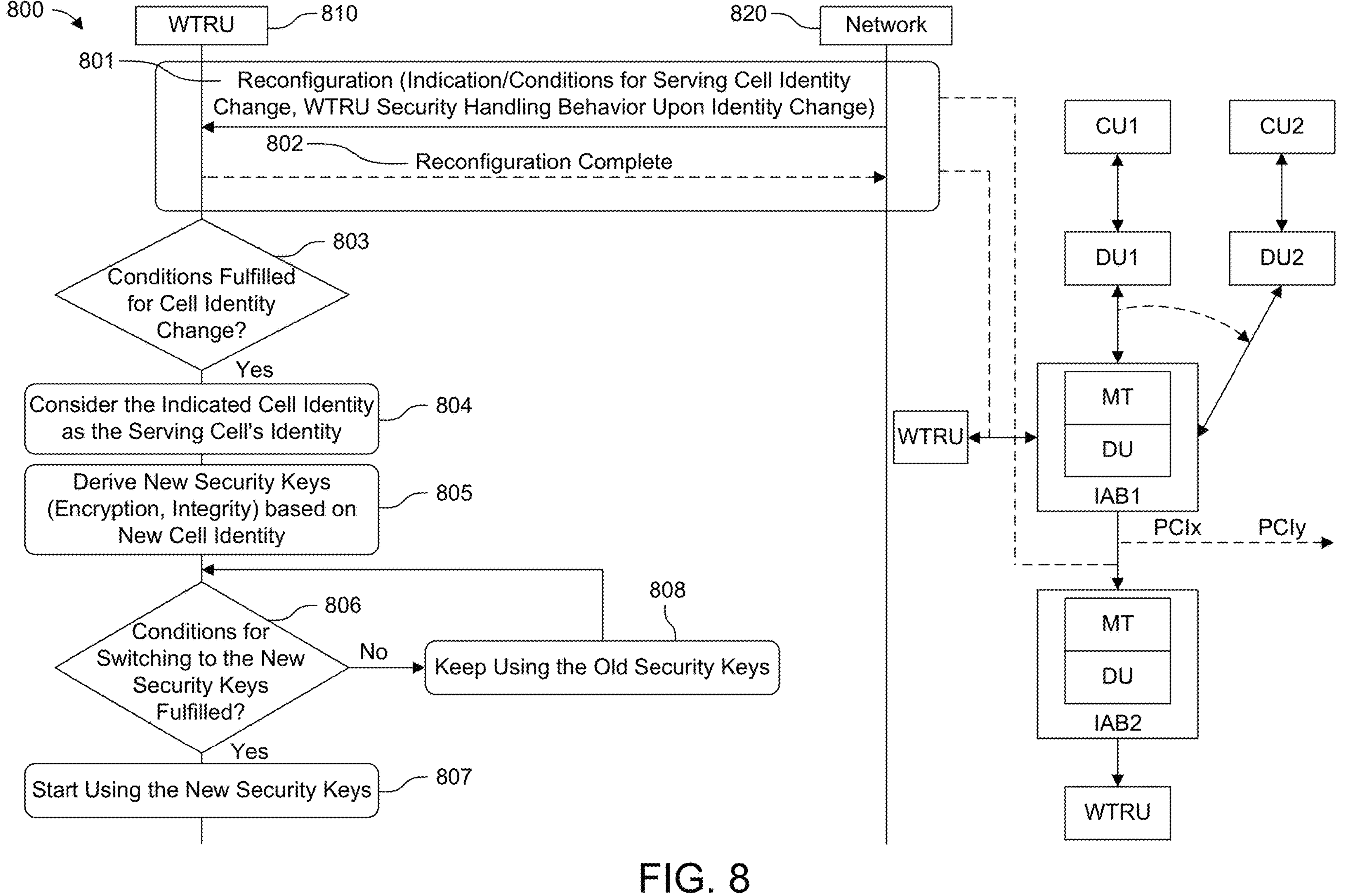
FIG. 8 is a flow diagram of a method for detecting change in serving cell identity and considering the new cell identity as the identity of the serving cell, according to an embodiment.

FIG. 8 is a flow diagram of a method for detecting change in serving cell identity and considering the new cell identity as the identity of the serving cell, without triggering RLF/re-establishment, according to an embodiment. At 801, WTRU 810 operating in CONNECTED mode receives an indication from the network 820 regarding changes in the serving cell's identity (e.g., PCI, CGI, etc.) and associated WTRU behavior. In some embodiments, the associated WTRU behavior may comprise WTRU security handling behavior upon identity changes. In some embodiments, the WTRU 810 may further receive one or more conditions for serving cell identity change. At 802, the WTRU 810 may send an indication to the network 820 that reconfiguration is complete.

If one or more conditions are specified at 801, the WTRU 810 may determine if the one or more conditions are met at 803. If the one or more conditions are met, the WTRU 810 may consider the indicated cell identity as the serving cell's identity at 804, and may derive new security keys for encryption and integrity protection based on the new cell identity at 805. The one or more conditions may comprise a specified duration (e.g., delta time or a specific slot/frame) and/or failure of old identity. The failure of old identity condition may comprise the WTRU searching for a cell with a new cell identity if the WTRU cannot detect a cell with the identity of the current serving cell, and upon the WTRU discovering an equivalent identity of the current serving cell in another cell, considering the another cell as the new serving cell.

If one or more conditions for switching to the new security keys are fulfilled at 806, then the WTRU 810 may begin using the new security keys at 807. If the conditions for switching to the new security keys are not fulfilled, then the WTRU 810 may continue using the old security keys at 808.

The WTRU 810 may be configured to use the new security keys for encrypting/decrypting and integrity protection/verification of UL/DL packets in the PDCP in one of the following ways: (1) use the new keys for the UL (i.e., encryption and integrity protection) immediately after the computation of the new keys; (2) use the new keys for the DL (i.e. decryption and integrity verification) immediately after the computation of the new keys; (3) use the new keys for the UL (i.e., encryption and integrity protection) according to a specified duration (e.g., delta time from the computation of the keys, specific frame/slot number, etc.) after the computation of the new keys; (4) use the new keys for the DL (i.e. decryption and integrity verification) according to a specified duration (e.g., delta time from the computation of the keys, specific frame/slot number, etc.) after the computation of the new keys; and/or (5) keep using the old keys in the UL and DL, until a reception of a DL packet that is not associated with the new key (e.g., integrity verification with the old key fails, but integrity verification with the new key succeeds).

In some embodiments, a WTRU operating in CONNECTED mode may receive configuration information from the network regarding changes in information related to a neighbor cell's identity (e.g., PCI, CGI, etc.) and associated WTRU behavior. In some embodiments, the configuration information comprises conditions for these changes, such as specified duration (e.g., delta time or specific slot/frame). In some embodiments, the associated WTRU behavior may comprise the handling of neighbor measurements. Upon receipt of an indication from the network comprising the handling of neighbor measurements, and if one or more conditions are also specified, the fulfillment of the one or more conditions, the WTRU may consider the new identity an as the neighbor cell's identity. The WTRU may then update the measurements associated with the neighbor cell to reflect the change in identity. For example, in some embodiments, the WTRU may update the cell identity index in the measurement report.

In some embodiments, a WTRU operating in CONNECTED mode may receive configuration information from the network indicating a set of equivalent identities for the serving cell (e.g., list of PCIs, list of CGIs, etc.). If the WTRU is not able to detect the current PCI associated with the serving cell (e.g., in the SSBs it is measuring), the WTRU may be configured to not consider a radio link failure and instead try to detect the other equivalent PCIs. Upon the detection of one of the equivalent PCIs, the WTRU may be configured to consider the new PCI as the serving cell's PCI, consider the old PCI as belonging to a neighbor cell, and/or updates the security keys that are used for encryption and integrity protection based on the new PCI.

In some embodiments, a WTRU in INACTIVE mode may receive an indication (e.g., broadcast signaling) from the network indicating a change of the identity of the cell that the WTRU is currently camping on (e.g., PCI, CGI, TAC, etc.). Upon receipt of such indicating, the WTRU may: (1) refrain from triggering RAN area update (RANU), even if the PCT/TAC is not in the WTRU's RNA configuration; and/or (2) update the RNA configuration to include the new PCI/TAC.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit receive unit (WTRU), the method comprising:

receiving configuration information including information regarding a change in an identity of a serving cell, one or more conditions for the change in the identity of the serving cell, and associated WTRU behavior, wherein the configuration information includes a new identity or a set of equivalent new identities;

monitoring the one or more conditions for the change in the identity of the serving cell;

on a condition that the one or more conditions for the change in the identity of the serving cell are fulfilled:

determining that the WTRU does not detect a cell with an identity of a current serving cell;

in response to the determining, searching for a cell with the new identity or one of the equivalent new identities; and on a condition that the WTRU detects a cell with the new identity or one of the equivalent new identities, changing the identity of the serving cell to the new identity, or one of the equivalent new identities;

deriving one or more new security keys based on the new cell identity; and using the one or more new security keys according to a configured security key handling behavior.

2. The method of claim 1, wherein the identity of the serving cell is one of physical cell identity (PCI) or cell global identity (CGI).

3. The method of claim 1, wherein the one or more conditions include a specified time period elapsing.

4. The method of claim 1, wherein the associated WTRU behavior includes information related to handling of security upon an identity change.

5. The method of claim 1, wherein the configuration information comprises one or more conditions for using the one or more new security keys.

6. The method of claim 5, wherein the one or more conditions for using the one or more new security keys include the WTRU receiving a downlink packet that fails integrity verification using one or more old security keys.

7. The method of claim 1, wherein the one or more new security keys are for encryption and integrity protection for uplink (UL) data based on the new identity.

8. The method of claim 7, wherein the one or more new security keys are for integrity verification and decryption for downlink (DL) data.

9. A wireless transmit receive unit (WTRU) comprising:

a receiver; and a processor, wherein the receiver and processor are configured to receive configuration information regarding a change in an identity of a serving cell, one or more conditions for the change in the identity of the serving cell, and associated WTRU behavior, wherein the configuration information includes a new identity, or a set of equivalent new identities;

monitor the one or more conditions for the change in the identity of the serving cell; and on a condition that the one or more conditions for the change in the identity of the serving cell are fulfilled:

determine that the WTRU does not detect a cell with an identity of a current serving cell;

search for a cell with the new identity, or one of the equivalent new identities; and on a condition that the WTRU detects a cell with the new identity, or one of the equivalent new identities, change the identity of the serving cell to the new identity, or one of the equivalent new identities;

derive one or more new security keys based on the new identity; and use the one or more new security keys according to a configured security key handling behavior.

10. The WTRU of claim 9, wherein the identity of the serving cell is one of physical cell identity (PCI) or cell global identity (CGI).

11. The WTRU of claim 9, wherein the one or more conditions include a specified time period elapsing.

12. The WTRU of claim 9, wherein the associated WTRU behavior includes information related to handling of security upon an identity change.

13. The WTRU of claim 9, wherein the configuration information comprises one or more conditions for using the one or more new security keys.

14. The WTRU of claim 13, wherein the one or more conditions for using the one or more new security keys include the WTRU receiving a downlink packet that fails integrity verification using one or more old security keys.

15. The WTRU of claim 9, wherein the one or more new security keys are for encryption and integrity protection for uplink (UL) data based on the new identity.

16. The WTRU of claim 9, wherein the one or more new security keys are for integrity verification and decryption for downlink (DL) data.

* * * * *